United States Patent
Imon et al.

(10) Patent No.: US 10,180,894 B2
(45) Date of Patent: Jan. 15, 2019

(54) IDENTIFYING A STACK FRAME RESPONSIBLE FOR RESOURCE USAGE

(71) Applicant: Microsoft Technology Licensing, LLC, Redmond, WA (US)

(72) Inventors: Sk Kajal Arefin Imon, Redmond, WA (US); Navid Jalali Heravi, Seattle, WA (US); Ivan Michael Berg, Sammamish, WA (US); Cong Chen, Sammamish, WA (US); Feng Liang, Issaquah, WA (US); Michael D. Moshofsky, Seattle, WA (US); David Gregory Grant, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 30 days.

(21) Appl. No.: 15/621,891

(22) Filed: Jun. 13, 2017

(65) Prior Publication Data
US 2018/0357147 A1 Dec. 13, 2018

(51) Int. Cl.
*G06F 11/34* (2006.01)
*G06F 11/36* (2006.01)

(52) U.S. Cl.
CPC ...... *G06F 11/3636* (2013.01); *G06F 11/3476* (2013.01); *G06F 11/3433* (2013.01); *G06F 11/3495* (2013.01)

(58) Field of Classification Search
CPC .................................................. G06F 11/3636
USPC .......................................................... 717/128
See application file for complete search history.

(56) References Cited

U.S. PATENT DOCUMENTS

| | | | |
|---|---|---|---|
| 5,828,883 A * | 10/1998 | Hall ..................... | G06F 11/3409 717/133 |
| 6,002,872 A | 12/1999 | Alexande et al. | |
| 6,219,826 B1 * | 4/2001 | De Pauw .............. | G06F 11/323 714/E11.181 |
| 6,507,805 B1 * | 1/2003 | Gordon ............... | G06F 11/3466 702/186 |
| 6,651,243 B1 | 11/2003 | Berry et al. | |
| 6,732,357 B1 * | 5/2004 | Berry .................. | G06F 11/3636 717/158 |

(Continued)

OTHER PUBLICATIONS

Froyd, et al., "Low-Overhead Call Path Profiling of Unmodified, Optimized Code", In Proceedings of the 19th annual international conference on Supercomputing, Jun. 20, 2005, pp. 81-90.

(Continued)

*Primary Examiner* — Qing Chen
*Assistant Examiner* — Clint Thatcher
(74) *Attorney, Agent, or Firm* — Liang IP, PLLC

(57) ABSTRACT

Techniques for identifying a stack frame responsible for resource usage are described. For instance, techniques described herein enable a particular process and a particular stack frame and/or set of stack frames of the process that are high resource consumers to be identified. According to various implementations, resource usage of a process is observed and recorded over a period of time. A data structure is generated that characterizes the resource usage of the process over the sampling period. The data structure be evaluated to identify a stack frame that is responsible for excess resource consumption. In at least some implementations, a remedial procedure can be performed to attempt to reduce the process's resource usage.

20 Claims, 7 Drawing Sheets

(56) References Cited

U.S. PATENT DOCUMENTS

| | | | | |
|---|---|---|---|---|
| 6,751,789 B1* | 6/2004 | Berry | ................. | G06F 11/3466 |
| | | | | 714/35 |
| 7,389,497 B1* | 6/2008 | Edmark | ............. | G06F 11/3612 |
| | | | | 714/E11.207 |
| 8,032,867 B2* | 10/2011 | Bansal | ................ | G06F 11/3419 |
| | | | | 717/127 |
| 9,032,254 B2 | 5/2015 | Shochat et al. | | |
| 9,077,610 B2 | 7/2015 | Bansal et al. | | |
| 9,483,378 B2 | 11/2016 | Kopp et al. | | |
| 2006/0130001 A1 | 6/2006 | Beuch et al. | | |
| 2007/0277157 A1 | 11/2007 | Dewitt et al. | | |
| 2011/0113407 A1* | 5/2011 | Mariani | ............. | G06F 11/3409 |
| | | | | 717/130 |
| 2012/0191893 A1 | 7/2012 | Kuiper et al. | | |
| 2014/0282431 A1* | 9/2014 | Delio, Jr. | ............ | G06F 11/3466 |
| | | | | 717/130 |
| 2015/0309915 A1* | 10/2015 | Ajith Kumar | ...... | G06F 11/3636 |
| | | | | 717/128 |
| 2016/0277257 A1* | 9/2016 | Addleman | .......... | G06F 11/3466 |
| 2018/0101466 A1* | 4/2018 | O'Dowd | ............. | G06F 11/3664 |

OTHER PUBLICATIONS

Perks, et al., "Exploiting Spatiotemporal Locality for Fast Call Stack Traversal", In Proceedings of Second Workshop on High-performance Infrastructure for Scalable Tools, Jun. 29, 2012, 9 pages.

"Monitoring the Call Stack", https://msdn.microsoft.com/en-us/library/aa263473(v=vs.60).aspx, Retrieved on: Feb. 1, 2017, 3 pages.

* cited by examiner

IDENTIFYING A STACK FRAME RESPONSIBLE FOR RESOURCE USAGE

BACKGROUND

Modern devices include a variety of device resources, such as processing units (e.g., a central processing unit (CPU)), data storage, primary memory, input/output devices, and so on. Further, these device resources can be employed to perform various tasks, such as executing processes for an application or system service. Situations occur, however, where a particular process may utilize an inordinate amount of a particular resource. Such situations can be detrimental to device performance and thus decrease user satisfaction with their device experience.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for identifying a stack frame responsible for resource usage are described. For instance, techniques described herein enable a particular process and a particular stack frame and/or set of stack frames of the process that are high resource consumers to be identified. According to various implementations, resource usage of a process is observed and recorded over a period of time. A data structure is generated that characterizes the resource usage of the process over the sampling period. The data structure be evaluated to identify a stack frame that is responsible for excess resource consumption. In at least some implementations, a remedial procedure can be performed to attempt to reduce the process's resource usage.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Identical numerals followed by different letters in a reference number may refer to difference instances of a particular item.

DETAILED DESCRIPTION

Figure 1:
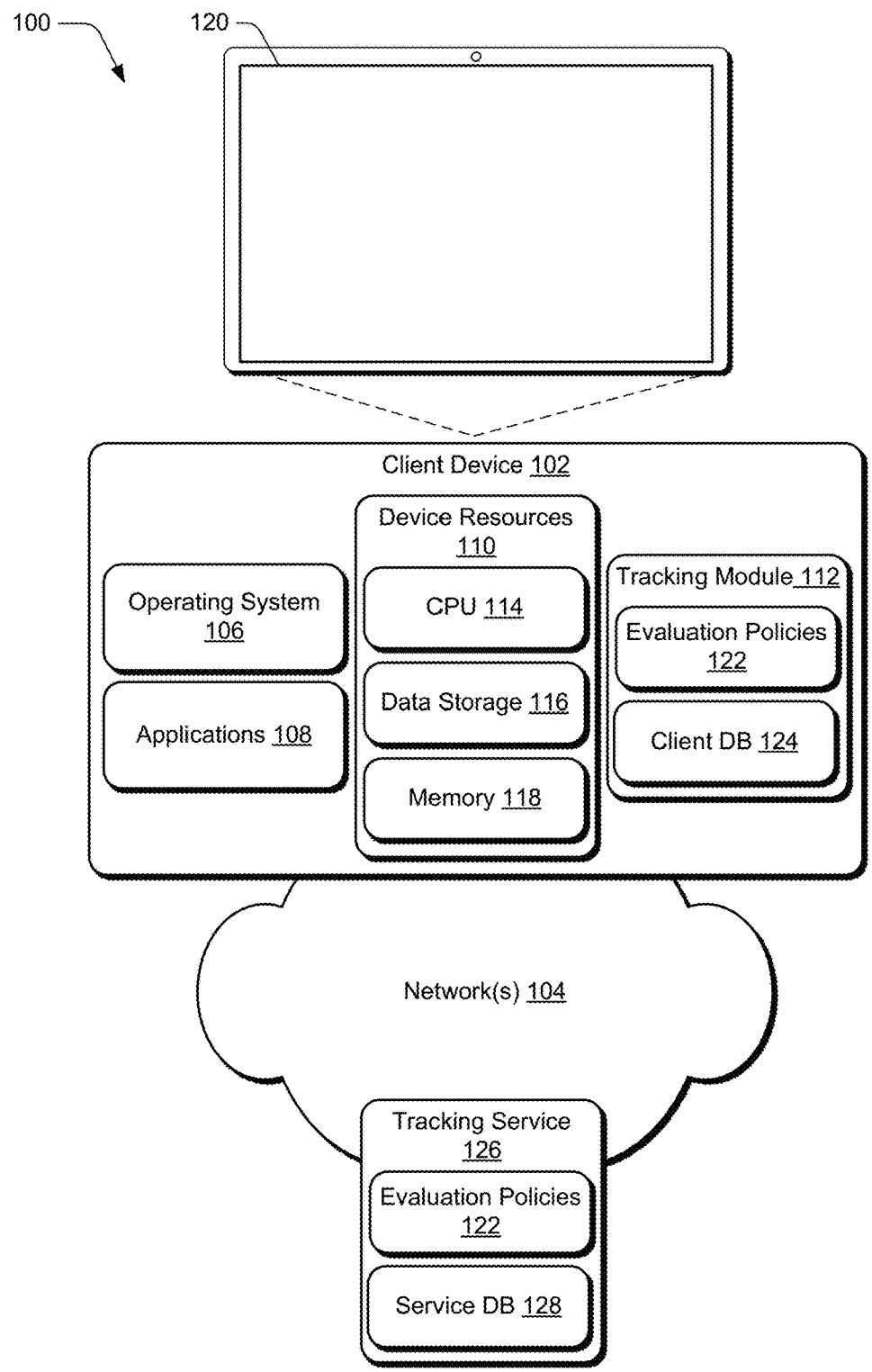
FIG. 1 is an illustration of an environment in an example implementation that is operable to employ techniques discussed herein.

Techniques for identifying a stack frame responsible for resource usage are described. Generally, a device includes various resources, such as data processing and storage resources, that can be employed to perform various tasks. However, a particular process executing on the device can consume an inordinate amount of a particular device resource. For instance, an error in application code can cause a particular process (e.g., thread) of the application to consume excess processor bandwidth and/or processor time. Accordingly, techniques described herein enable a particular process and a particular stack frame and/or set of stack frames of the process that are high resource consumers to be identified. In at least some implementations, a remedial procedure can be performed to attempt to reduce the process's resource usage.

According to various implementations, resource usage of a process is observed and recorded over a period of time. For instance, snapshots of a process can be captured at intervals over a sampling period. The snapshots are then aggregated into a data structure that characterizes the resource usage of the process over the sampling period. In at least some implementations, the data structure is implemented as a tree that is populated with call stacks and stack frames of the process. Further, each stack frame is characterized with reference to its respective contribution to overall resource consumption of the process. Thus, the tree can be evaluated to identify a stack frame that is responsible for excess resource consumption, referred to herein as a "blame frame."

In at least one implementation, when a blame frame is identified, information about the blame frame can be used in various ways. For instance, the information can be communicated to an entity that owns a process responsible for the stack frame, such as an application developer. The entity can use this information to attempt to optimize process code and reduce resource consumption of the process. In another implementation, an automatic debugging procedure can be implemented to attempt to debug executable code of the process to reduce resource consumption of the process. In at least one implementations, the process can be stopped until a fix for the excessive resource consumption is identified and applied.

Thus, techniques described herein enable accurate identification of excessive resource consuming processes and portions of processes, such that the processes can be optimized to reduce resource consumption. This enables device performance to be improved, such as by reducing processor load, increasing battery life, increasing memory speed, and so forth.

In the following discussion, an example environment is first described that is operable to employ techniques described herein. Next, some example implementation scenarios are described in accordance with one or more implementations. Following this, some example procedures are described in accordance with one or more implementations. Finally, an example system and device are described that are operable to employ techniques discussed herein in accordance with one or more implementations. Consider now an example environment in which example implementations may be employed.

FIG. 1 is an illustration of an environment 100 in an example implementation that is operable to employ techniques for identifying a stack frame responsible for resource usage described herein. Generally, the environment 100 includes various devices, services, and networks that enable communication via a variety of different modalities. For instance, the environment 100 includes a client device 102 connected to a network 104. The client device 102 may be configured in a variety of ways, such as a traditional computer (e.g., a desktop personal computer, laptop computer, and so on), a mobile station, an entertainment appliance, a smartphone, a wearable device, a netbook, a game console, a handheld device (e.g., a tablet), and so forth.

The network 104 is representative of a network that provides the client device 102 with connectivity to various networks and/or services, such as the Internet. The network 104 may provide the client device 102 with connectivity via a variety of different connectivity technologies, such as broadband cable, digital subscriber line (DSL), wireless cellular, wireless data connectivity (e.g., WiFi™), T-carrier (e.g., T1), Ethernet, and so forth. In at least some implementations, the network 104 represents different interconnected wired and wireless networks.

The client device 102 includes a variety of different functionalities that enable various activities and tasks to be performed. For instance, the client device 102 includes an operating system 106, applications 108, device resources 110, and a tracking module 112. Generally, the operating system 106 is representative of functionality for abstracting various system components of the client device 102, such as hardware, kernel-level modules and services, and so forth. The operating system 106, for instance, can abstract various components of the client device 102 (e.g., the device resources 110) to the applications 108 to enable interaction between the components and the applications 108.

The applications 108 represent functionalities for performing different tasks via the client device 102. Examples of the applications 108 include a word processing application, a spreadsheet application, a web browser, a gaming application, and so forth. The applications 108 may be installed locally on the client device 102 to be executed via a local runtime environment, and/or may represent portals to remote functionality, such as cloud-based services, web apps, and so forth. Thus, the applications 108 may take a variety of forms, such as locally-executed code, portals to remotely hosted services, and so forth.

The device resources 110 generally represent different hardware and logic resources that can be utilized by the client device 102 to perform various tasks, such as data processing, data storage, program execution, network connectivity, and so forth. The device resources 110 include a central processing unit (CPU) 114, data storage 116, and memory 118. The CPU 114 is representative of functionality for performing data processing and instruction execution for the client device 102. The data storage 116 is representative of functionality for storing data, such as for persistent data storage to which data can be written, and from which data can be read. The memory 118 is representative of a primary memory resources of the client device 102, such as random access memory (RAM). These device resources 110 are presented for purpose of example, and it is to be appreciated that the device resources 110 can include other instances of resources, such as input/output resources (e.g., I/O devices), communication and/or connectivity resources (e.g., network ports), power resources (e.g., a battery), and so on.

The client device 102 further includes a display device 120, which represents functionality for visual output for the client device 102. Additionally, the display device 120 represents functionality for receiving various types of input, such as touch input, pen input, and so forth. The display device 120, for example, represents an instance of the device resources 110.

According to various implementations, the tracking module 112 is representative of functionality for tracking usage of the device resources 110, and identifying processes that meet certain usage criteria for usage of the device resources 110. The tracking module 112 includes evaluation policies 122 and a client process database ("client DB") 124. Generally, the evaluation policies 122 represent criteria for identifying processes that may exceed usage thresholds for the device resources 110. The client DB 124 represents a collection of data that identifies processes that meet certain usage criteria for the device resources 110. For instance, when the tracking module 112 detects that a particular process meets a certain usage criteria for usage of a device resource 110, the tracking module 112 can create an entry in the client DB 124 that identifies the process, the device resource 110, and usage statistics pertaining to the usage of the device resource 110. As further detailed below, the tracking module 112 can aggregate data collected by the client DB 124 into a data structure (e.g., a tree) that describes attributes of resource usage by a particular process, such as with reference to a call stack and individual stack frames for the process.

Further to techniques for identifying a stack frame responsible for resource usage described herein, the environment 100 includes a tracking service 126, which includes the evaluation policies 122 and a service usage database ("service DB") 128. Generally, the tracking service 126 represents a network-based (e.g., cloud) service that can perform aspects of identifying a stack frame responsible for resource usage described herein. As referenced above, The evaluation policies 122 represent criteria for identifying processes that may exceed usage thresholds for device resources of different devices, such as the device resources 110 of the client device. The service DB 128 represents a collection of data that identifies processes that meet certain usage criteria for device resources of different devices, such as the device resources 110 of the client device 102. For instance, resource usage data obtained locally on the client device 102 and stored on the client DB 124 can be propagated (e.g., pushed to and/or pulled from) to the service DB 128 and stored for processing and analysis.

According to various implementations, techniques for identifying a stack frame responsible for resource usage described herein can be performed on the client device 102 via the tracking module 112, by the tracking service 126, and/or via interaction between the tracking module 112 and the tracking service 126.

Figure 2:
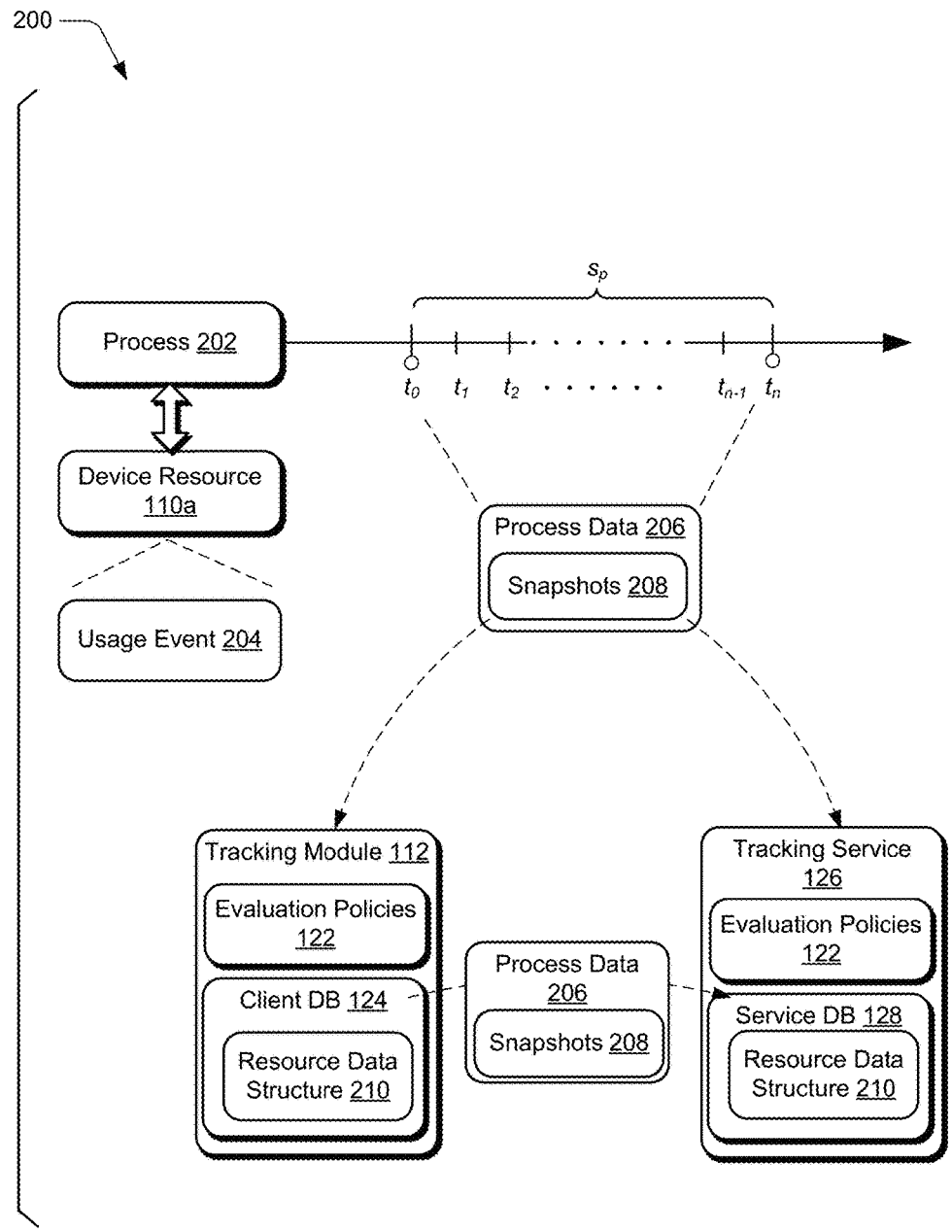
FIG. 2 depicts an example implementation scenario for aggregating resource usage data and using the resource usage data to generate a data structure that describes resource usage over time in accordance with one or more implementations.

FIG. 2 depicts an example implementation scenario 200 for aggregating resource usage data and using the resource usage data to generate a data structure that describes resource usage over time. Generally, the scenario 200 may be implemented on the client device 102 and/or via interaction between the client device 102 and the tracking service 126.

The scenario 200 includes a process 202 that is executing on the client device 102. The process 202, for instance, represents a thread that is executing on the CPU 114. Generally, the process 202 represents an execution task for a particular functionality, such as an application 108, the operating system 106, and so forth.

In the scenario 200, the tracking module 112 detects a usage event 204 associated with usage of a device resource 110a by the process 202. In at least one implementation, the usage event 204 occurs in response to the tracking module 112 detecting that the usage of the device resource 110a by the process 202 meets a certain criteria specified by the evaluation policies 122. For instance, in an example where the device resource 110a is the CPU 114, the usage event 204 may be fired when usage of the CPU 114 by the process 202 exceeds a threshold percentage of total available CPU bandwidth, and/or that the usage exceeds a threshold duration of time. As another example, when the device resource 110a is the data storage 116, the usage event 204 may be fired when accesses by the process 202 to the data storage 116 (e.g., reads and/or writes) exceeds a threshold number of accesses.

In at least one implementation, the usage event 204 can be fired in response to a change in device state, such as a change in power state. For instance, consider that the client device 102 is unplugged from an external alternating current (AC) power supply such that the client device 102 begins operating under battery power. This change in power state can cause the usage event 204 to be fired such that process data starts being captured for the process 202 and while the client device 102 is operating under battery power. Similarly, when the client device 102 transitions from battery power to an external power supply, this can trigger the usage event 204. Thus, usage statistics for the process 202 can be collected for different device states of the client device 102.

Alternatively or additionally to an automatically detected event, the usage event 204 may occur in response to a user input. A user, for instance, may provide input requesting that usage information for the device resource 110a be collected. Further, it is to be appreciated that the usage event 204 may pertain to usage of other device resources 110 alternatively or additionally to the CPU 114 and/or the data storage 116.

In response to the usage event 204, the tracking module 112 collects process data 206 over a sampling period $s_p$ ($t_0$, $t_n$). The process data 206, for instance, includes snapshots 208 of the process 202 at distinct points in time $t_0$, $t_1$, $t_2$, . . . to that occur over the duration of time of the sampling period $s_p$. Generally, the points in time $t_0$, $t_1$, $t_2$, . . . $t_n$ can be configured in various ways, such as every 1 millisecond (ms), every 250 ms, every 500 ms, every second, every 10 seconds, and so forth.

Each snapshot 208 includes various information about the process 202 at a distinct point in time, such as a name of the process, a timestamp at which the snapshot was captured, a name of an application/service that owns the process, a resource usage value by the process for the device resource 110a at the distinct point in time, call stack details for the process at the time the snapshot was captured, and so forth.

Continuing with the scenario 200, the tracking module 112 aggregates the process data 206 into a resource data structure 210 that organizes the process data 206 according to usage statistics for the device resource 110a. The resource data structure 210, for instance, characterizes the process 202 in terms of its usage of the device resource 110a over the period $s_p$. As further detailed below, the resource data structure 210 can be analyzed (e.g., queried) to determine which aspect(s) of the process 202 may be responsible for primary usage of the device resource 110a.

Alternatively or additionally to generating the resource data structure 210 by the tracking module 112 on the client device 102, the process data 206 can be communicated to the tracking service 126. The tracking service 126 can then utilize the process data 206 to generate the resource data structure 210. In such an implementation, offloading the processing of the process data 206 and the creation of the resource data structure 210 to the tracking service 126 conserves local device resources 110 of the client device 102.

Figure 3:
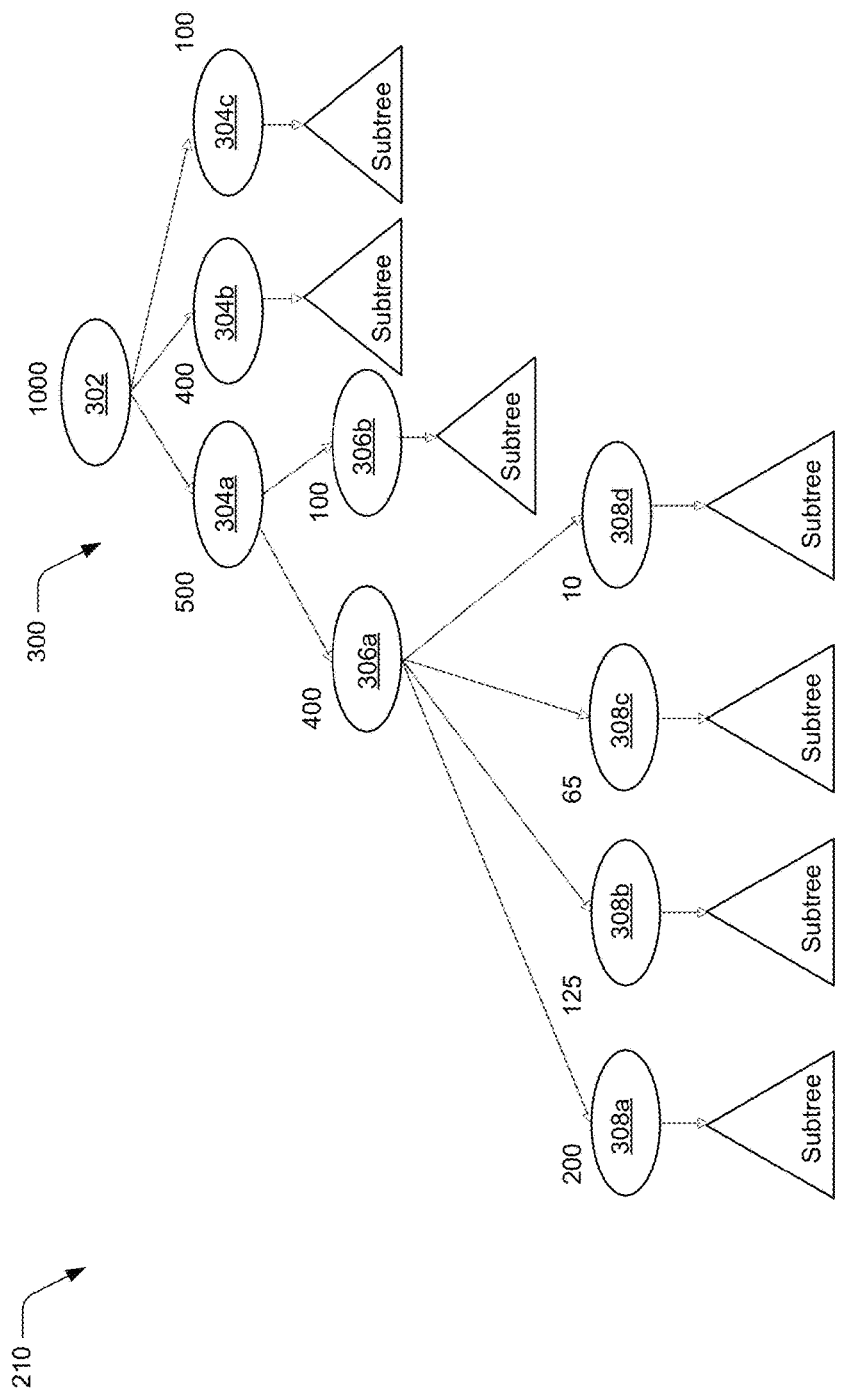
FIG. 3 depicts an example implementation of a portion of a resource data structure in accordance with one or more implementations.

FIG. 3 depicts an example implementation of a portion of the resource data structure 210. In this particular example, the resource data structure 210 is implemented as a tree 300, but it is to be appreciated that the resource data structure 210 may be configured using a variety of different data structures.

Generally, the tree 300 includes a root node 302 that represents the process 202, and leaf nodes that represent different stack frames of call stacks of the process 202 that are observed as part of the snapshots 208 of the process 202. The leaf nodes are arranged in the tree 300 according to their hierarchy in their respective call stacks. Further, each leaf node is characterized according to its contribution to a total resource usage of the device resource 110a over the sample period $s_p$.

In addition to characterization resource usage over time, the tree 300 can characterize resource usage associated with different state conditions of the client device. For instance, the tree 300 can characterize resource usage for a particular power state of the client device 102, such as when the client device 102 is operating under battery power and/or AC power.

In this particular example, the process 202 has a total resource usage value of 1000 over the sample period $s_p$. Generally, this value may be arbitrarily assigned to characterize the usage of the device resource 110a by the process 202 over the sample period $s_p$. Alternatively, the value can represent an actual quantified resource usage, such as bandwidth usage of the CPU 114, a period of time over which the process 202 utilized the CPU 114, a number of accesses to the data storage 116 over the sample period $s_p$, and so forth.

Descending the tree 300, each of the leaf nodes represents a particular stack frame and is characterized with respect to the contribution of the respective stack frame to the total resource usage value. For instance, stack frames 304a, 304b, and 304c descend from the root node 302 and have resource usage values of 500, 400, and 100, respectively. Descending from the stack frame 304a are stack frames 306a, 306b that have resource usage values of 400 and 100, respectively. Further, descending from the stack frame 306a are stack frames 308a, 308b, 308c, and 308d, which have resource usage values of 200, 125, 65, and 10, respectively.

Generally, the tree 300 can be evaluated in various ways to identify a stack frame or set of stack frames that have a highest contribution to resource usage of the device resource 110a. For instance, in a simple implementation, the tree 300 can be traversed from the root 302 and since the stack frame 304a has a highest resource usage value of the stack frames presented in the tree 300, the stack frame 304a can be designated as a blame frame for the process 202. A particular evaluation policy 122, for instance, can specify that a stack frame with a highest usage contribution is to be selected as a blame frame.

In another implementation, certain stack frames can be designated as skip frames that are not to be identified as blame frames. A skip frame, for instance, may represent a stack frame that is associated with a high priority task that is entitled to high resource usage. Alternatively or additionally, a skip frame may represent a stack frame that is known to be associated with high resource usage. In such implementations, a particular evaluation policy 122 can identify a certain stack frame and/or set of stack frames as skip frames. In such an implementation, when the tree 300 is evaluated to identify a stack frame that exhibits high resource usage, any skip frames identified in an evaluation policy 122 are skipped, i.e., are not considered when identifying high resource using stack frames.

In an alternative or additional implementation, when the tree 300 is traversed to identify a stack frame and/or set of stack frames that have a greatest contribution to resource usage, a termination criterion can be specified that indicates when a blame frame is to be assigned. For instance, a percentage threshold of t % (percent) of resource usage of a parent node can be used as a criterion to determine when to assign a blame frame. As an example, consider that a percentage threshold of 30% of total resource usage is specified for traversing the tree 300. Accordingly, when the resource usage of each individual child node of a parent node is 30% or lower, traversal of the tree 300 will stop and a stack frame associated with the parent node will be assigned as a blame frame.

Alternatively or additionally, a threshold node depth of d % of total node depth in the tree 300 can be specified such that when the tree 300 is traversed until d % is reached, a stack frame with the highest resource usage at that depth is assigned as the blame frame.

In an example traversal of the tree 300 to identify a stack frame that exhibits high resource usage, consider that the stack frame 304a, 304b, and 304c are designated as skip frames. Accordingly, traversal of the tree 300 proceeds to the stack frame 306a since it has the next highest usage value. The stack frames 308a-308d which are child nodes of the stack frame 306a are then evaluated based on their contribution to the resource usage of the stack frame 306a. The stack frame 308a contributes the most resource usage of this group of stack frames, and is not below threshold percentage (e.g., 30%) of the resource usage of the stack frame 306a. Thus, the stack frame 308a is designated as a blame frame for the process 202.

According to various implementations, when a blame frame is assigned, information about the blame frame can be utilized to attempt to reduce resource usage of the process. For instance, consider that the stack frame 308a is designated as a blame frame for the process 202. Accordingly, an application/service that owns the process 202 can be identified, and a party responsible for the application/service can be identified, such as an application developer, an information technology (IT) entity, a hardware manufacturer, and so forth. Thus, the responsible party can be notified that the stack frame 308a is consuming excessive device resource. This gives the responsible party an opportunity to investigate why the stack frame 308a is consuming excessive device resource, such as by examining executable code that generates the stack frame 306a for coding errors and/or inefficiencies.

The following discussion describes some example procedures for identifying a stack frame responsible for resource usage in accordance with one or more implementations. The example procedures may be employed in the environment 100 of FIG. 1, the system 700 of FIG. 7, and/or any other suitable environment. The procedures, for instance, represent example procedures for implementing the implementation scenarios described above. In at least some implementations, the steps described for the various procedures are implemented automatically and independent of user interaction. According to various implementations, the procedures may be performed locally (e.g., at the client device 102) and/or at a network-based service, such as the tracking service 126.

Figure 4:
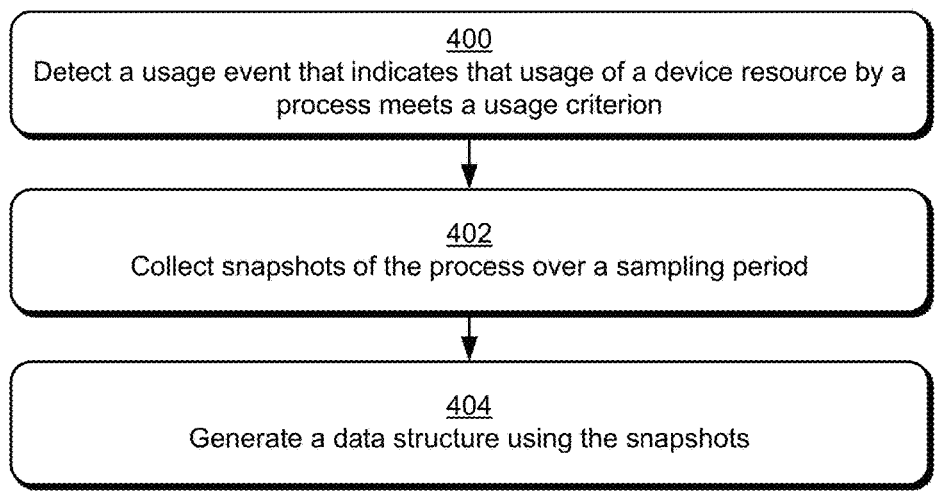
FIG. 4 is a flow diagram that describes steps in a method for generating a data structure that describes resource usage by a process in accordance with one or more implementations.

FIG. 4 is a flow diagram that describes steps in a method in accordance with one or more implementations. The method, for instance, describes an example procedure for generating a data structure that describes resource usage by a process.

Step 400 detects a usage event that indicates that usage of a device resource by a process meets a usage criterion. For instance, the tracking module 112 ascertains that usage of a device resource 110 meets a certain usage criterion, examples of which are described above.

Step 402 collects snapshots of the process over a sampling period. The sampling period, for instance, represents a discrete period of time, such as 10 seconds, 30 seconds, 1 minute, 5 minutes, and so forth. According to various implementations, the snapshots are captured at discrete divisions of the sampling period, such as every 1 millisecond (ms), every 250 ms, every 500 ms, every second, every 10 seconds, and so forth. Generally, each snapshot includes various information about the process at a respective point in time, examples of which are discussed above.

Step 404 generates a data structure using the snapshots. For example, the data structure includes data that describes usage of the resource by the process over the sampling period. As described above, the data structure can be implemented as a data tree that includes leaf nodes that each represent different stack frames of call stacks generated by the process. Further, each leaf node can be associated with a resource usage value for a respective stack frame, such as an amount of resource usage exhibited by the stack frame over the sampling period.

Figure 5:
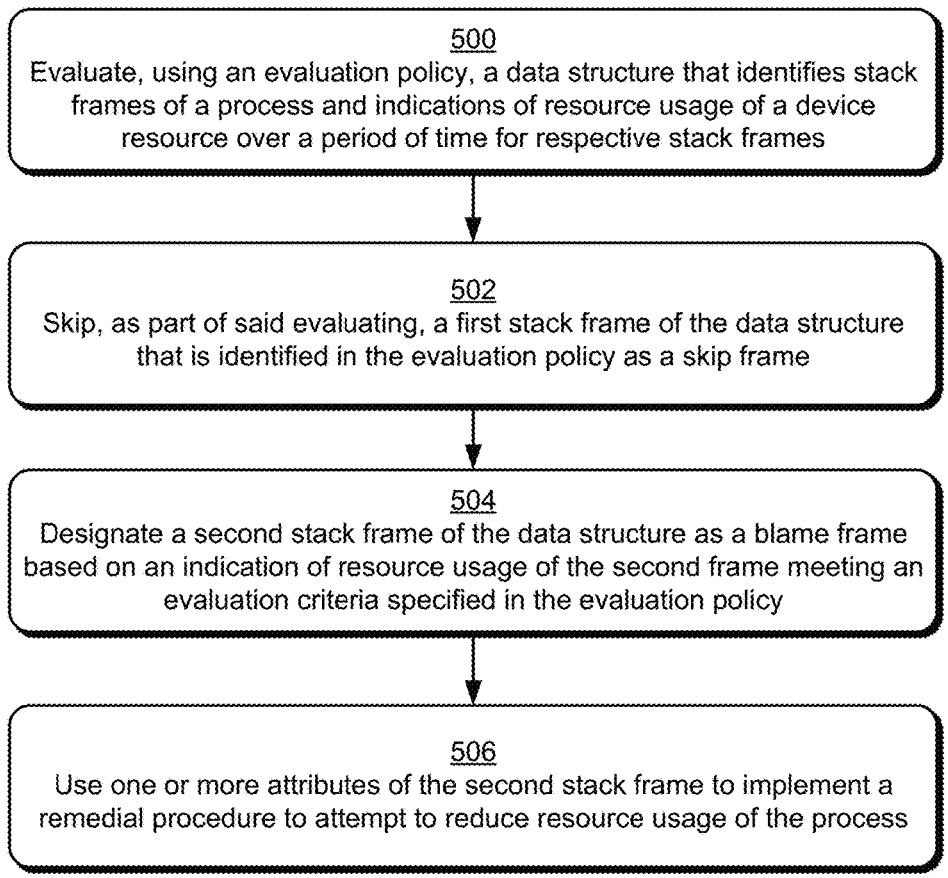
FIG. 5 is a flow diagram that describes steps in a method for evaluating a data structure to designate a blame frame for resource usage by a process in accordance with one or more implementations.

FIG. 5 is a flow diagram that describes steps in a method in accordance with one or more implementations. The method, for instance, describes an example procedure for evaluating a data structure to designate a blame frame for resource usage by a process.

Step 500 evaluates, using an evaluation policy, a data structure that identifies stack frames of a process and indications of resource usage of a device resource over a period of time for respective stack frames. Generally, the stack frames are taken from call stack snapshots captured over a sampling period, such as described above. As described above, the data structure can be implemented as a data tree, and thus the data tree can be evaluated by traversing the tree (e.g., top down) using the evaluation policy. The evaluation policy, for example, specifies a criterion to be used to determine when traversal of the tree is to terminate and a blame frame is to be designated.

Step 502 skips, as part of said evaluating, a first stack frame of the data structure that is identified in the evaluation policy as a skip frame. As referenced above, a stack frame can be designated as a skip frame for various reasons, such as based on a resource usage statistic of the stack frame known prior to said evaluating (e.g., that the stack frame is known to be a high resource user), based on the stack frame being associated with a high priority task, and so forth. Generally, skipping a stack frame means that the stack frame is not considered when evaluating a data structure to designate a blame frame.

Step 504 designates a second stack frame of the data structure as a blame frame based on an indication of resource usage of the second frame meeting an evaluation criteria specified in the evaluation policy. The second stack frame, for instance, is identified as having a higher resource usage value than other stack frames identified in the data structure.

Alternatively or additionally, a termination criterion occurs that indicates that evaluation of the tree is to be terminated and the second stack frame is to be designated as the blame frame. In at least one implementation, the first stack frame has a higher resource usage value than the second stack frame. However, since the first stack frame is a skip frame, the first stack frame is skipped as part of the evaluating and the second stack frame is designated as the blame frame.

Step 506 uses one or more attributes of the second stack frame to implement a remedial procedure to attempt to reduce resource usage of the process. Generally, various types of remedial procedures can be implemented. For instance, the client device 102 and/or the tracking service 126 can perform an automated debugging procedure to attempt to debug executable code of the process. If the automated debugging procedure is successful in correcting the executable code, the corrected executable code can be installed on the client device 102 such that the process is executable using the updated code.

As another example, execution of the process can be stopped on the client device 102 to prevent the process from continuing to overuse the device resource. In the meantime, the cause of the overuse can be diagnosed, such as be debugging the process.

As yet another example, an entity that owns the process can be notified that the process is exhibiting excess usage of the device resource. Examples of such an entity are described above. In at least one implementation, a corrected version of the process (e.g., corrected application code) can be received from the entity and installed on the client device 102 to replace the previous code of the process that was exhibiting excess resource usage.

Figure 6:
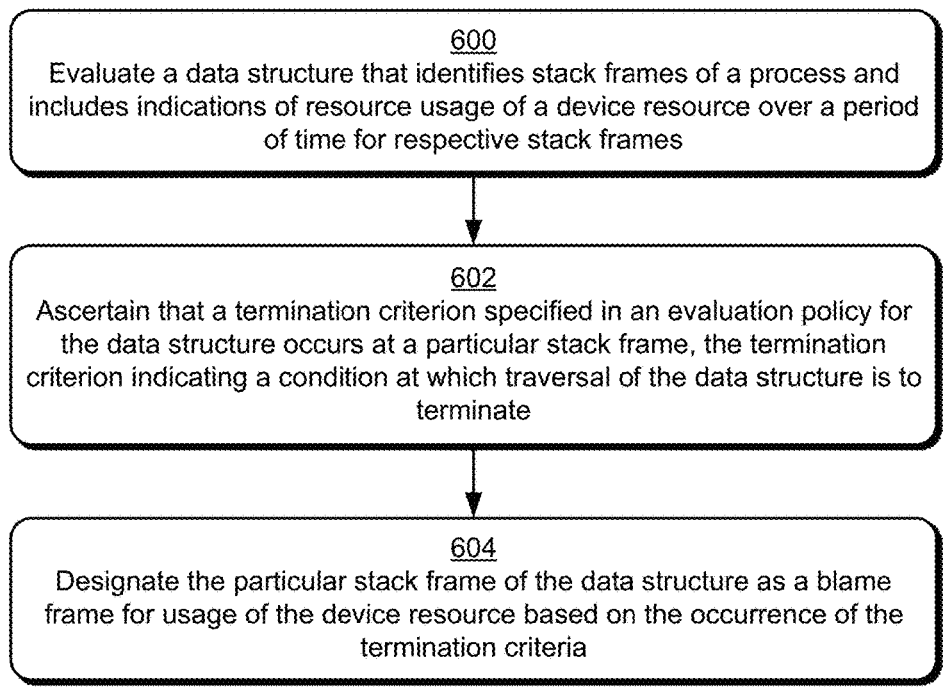
FIG. 6 is a flow diagram that describes steps in a method for terminating evaluation of a data structure to designate a blame frame for resource usage by a process.

FIG. 6 is a flow diagram that describes steps in a method in accordance with one or more implementations. The method, for instance, describes an example procedure for terminating evaluation of a data structure to designate a blame frame for resource usage by a process.

Step 600 evaluates a data structure that identifies stack frames of a process and includes indications of resource usage of a device resource over a period of time for respective stack frames. As discussed above, the data structure may be implemented as a tree whose nodes are populated with information about call stacks and stack frames of the process.

Step 602 ascertains that a termination criterion specified in an evaluation policy for the data structure occurs at a particular stack frame, the termination criterion indicating a condition at which traversal of the data structure is to terminate. In at least one implementation, the condition identifies a particular structural attribute of the data structure that when detected, is to cause termination of evaluation of the data structure. For instance, with reference to a data tree, the termination criterion can specify that when a resource usage contribution of each child node of a particular stack frame is less than a threshold percentage of the resource usage value of the particular stack frame, the particular stack frame is to be designated as the blame frame. As another example, with reference to a data tree, the termination criteria can specify a node depth at which traversal of the tree is to terminate and the blame frame is to be designated.

Step 604 designates the particular stack frame of the data structure as a blame frame for usage of the device resource based on the occurrence of the termination criteria. For instance, with reference to a tree, when the termination criterion occurs, the particular stack frame is the currently visited node in the traversal and thus the particular stack frame is designated as a blame frame.

In at least one implementation, a remedial procedure can be implemented using information about the blame frame. Examples of remedial procedures are described above.

According to one or more implementations, the procedures described above can be performed in real-time, such as while an instance of a process of interest is executing. For example, usage statistics for the process can be gathered and used to generate the aforementioned data structures in real time and while the process is executing. Further, a data structure can be evaluated in real time while a process is executing to identify a portion of the process (e.g., a stack frame and/or set of stack frames) that is exhibiting excess resource consumption. In at least one implementation, a remedial procedure for attempting to reduce resource consumption of the process can be performed in real time while the process is executing.

Accordingly, techniques described herein provide ways for identifying a process and/or a portion of a process (e.g., call stack and/or stack frame) that is primarily responsible for consumption of a particular device resource. In at least some implementations, this information can be used to implement a remedial procedure to reduce resource consumption and this increase device performance.

Having discussed some example procedures, consider now a discussion of an example system and device in accordance with one or more implementations.

Figure 7:
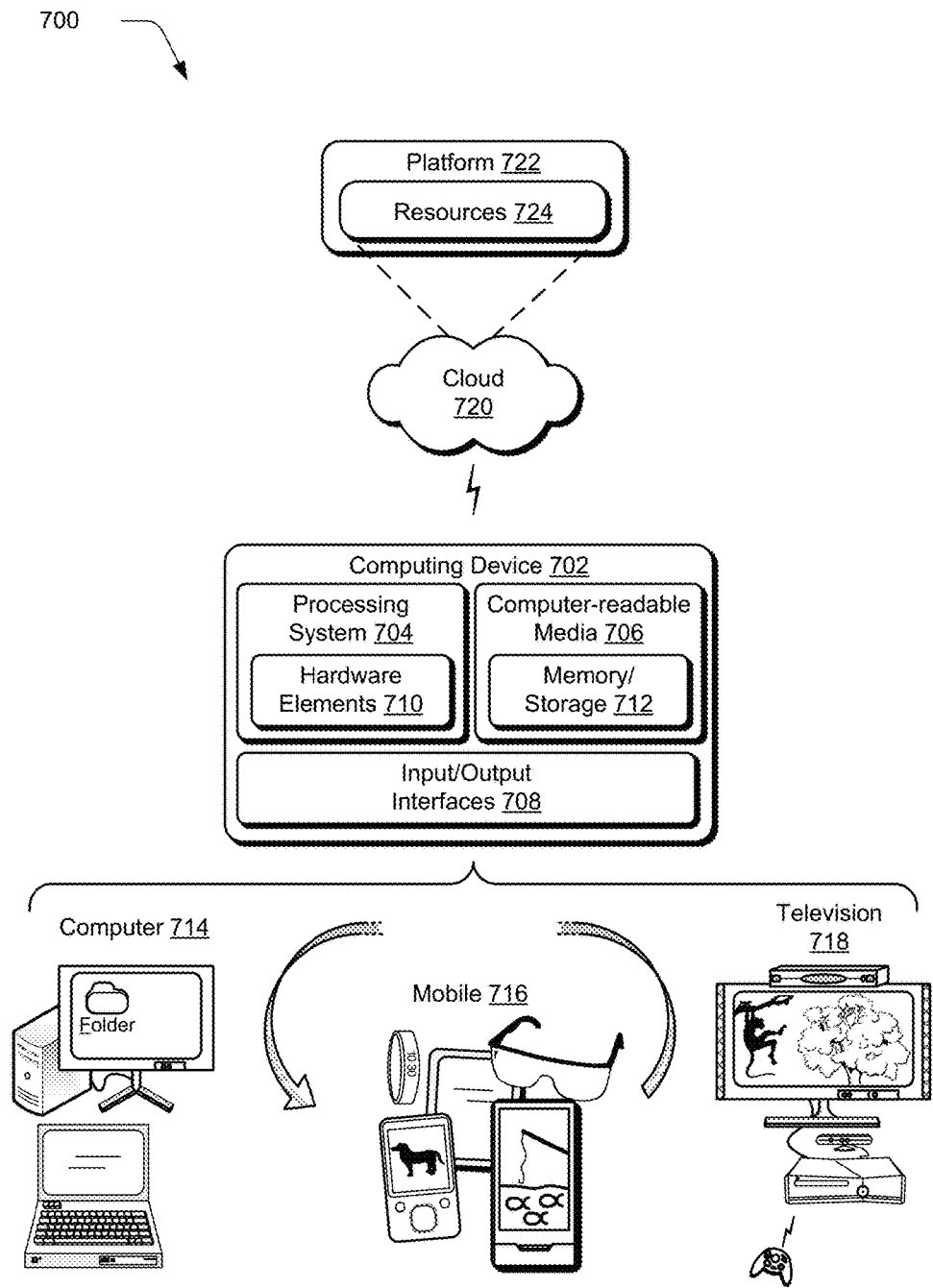
FIG. 7 illustrates an example system and computing device as described with reference to FIG. 1, which are configured to implement implementations of techniques described herein.

FIG. 7 illustrates an example system generally at 700 that includes an example computing device 702 that is representative of one or more computing systems and/or devices that may implement various techniques described herein. For example, the client device 102 and/or the tracking service 126 discussed above with reference to FIG. 1 can be embodied as the computing device 702. The computing device 702 may be, for example, a server of a service provider, a device associated with the client (e.g., a client device), an on-chip system, and/or any other suitable computing device or computing system.

The example computing device 702 as illustrated includes a processing system 704, one or more computer-readable media 706, and one or more Input/Output (I/O) Interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 710 and computer-readable media 706 are representative of instructions, modules, programmable device logic and/or fixed device logic implemented in a hardware form that may be employed in some implementations to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of modules that are executable by the computing device 702 as software may be achieved at least partially in hardware, e.g., through use of computer-readable storage media and/or hardware elements 710 of the processing system. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 702 may assume a variety of different configurations, such as for computer 714, mobile 716, and television 718 uses. Each of these configurations includes devices that may have generally different constructs and capabilities, and thus the computing device 702 may be configured according to one or more of the different device classes. For instance, the computing device 702 may be implemented as the computer 714 class of a device that includes a personal computer, desktop computer, a multi-screen computer, laptop computer, netbook, and so on.

The computing device 702 may also be implemented as the mobile 716 class of device that includes mobile devices, such as a mobile phone, portable music player, portable gaming device, a tablet computer, a wearable device, a multi-screen computer, and so on. The computing device 702 may also be implemented as the television 718 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. For example, functionalities discussed with reference to the tracking module 112 and/or the tracking service 126 may be implemented all or in part through use of a distributed system, such as over a "cloud" 720 via a platform 722 as described below.

The cloud 720 includes and/or is representative of a platform 722 for resources 724. The platform 722 abstracts underlying functionality of hardware (e.g., servers) and software resources of the cloud 720. The resources 724 may include applications and/or data that can be utilized while computer processing is executed on servers that are remote from the computing device 702. Resources 724 can also include services provided over the Internet and/or through a subscriber network, such as a cellular or Wi-Fi network.

The platform 722 may abstract resources and functions to connect the computing device 702 with other computing devices. The platform 722 may also serve to abstract scaling of resources to provide a corresponding level of scale to encountered demand for the resources 724 that are implemented via the platform 722. Accordingly, in an interconnected device embodiment, implementation of functionality described herein may be distributed throughout the system 700. For example, the functionality may be implemented in part on the computing device 702 as well as via the platform 722 that abstracts the functionality of the cloud 720.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Techniques for identifying a stack frame responsible for resource usage are described. Although implementations are described in language specific to structural features and/or methodological acts, it is to be understood that the implementations defined in the appended claims are not necessarily limited to the specific features or acts described. Rather, the specific features and acts are disclosed as example forms of implementing the claimed implementations.

In the discussions herein, various different implementations are described. It is to be appreciated and understood that each implementation described herein can be used on its own or in connection with one or more other implementations described herein. Further aspects of the techniques discussed herein relate to one or more of the following implementations.

A system for identifying a stack frame responsible for device resource usage, the system including: at least one processor; and one or more computer-readable storage media including instructions stored thereon that, responsive to execution by the at least one processor, cause the system perform operations including: evaluating, using an evaluation policy, a data structure that identifies stack frames from different call stacks of a process and indications of resource usage of a device resource over a period of time for respective stack frames; skipping a first stack frame of the data structure that is identified in the evaluation policy as a skip frame; and designating a second stack frame of the data structure as a blame frame for usage of the device resource based on an indication of resource usage of the second stack frame meeting an evaluation criteria specified in the evaluation policy.

In addition to any of the above described systems, any one or combination of: wherein the data structure is based on snapshots of the process captured at discrete intervals over the period of time; wherein the device resource includes one or more of a processing unit, a data storage, or a memory device; wherein the resource usage of the second stack frame includes one or more of: an amount of processing unit bandwidth utilized by the second stack frame; a period of time over which the second stack frame accessed the processing unit; a number of access operations by the second stack frame to a data storage; or an amount of memory utilized by the second stack frame; wherein the data structure is a tree, and the stack frames are represented by different nodes of the tree; wherein the data structure is a tree, and the first stack frame is closer to a root node of the tree than the second stack frame; wherein the first stack frame has a higher indication of resource usage of the device resource than the second stack frame; wherein at least some of the data structure is generated in real time using information identifying one or more of the call stacks received while the process is running; wherein at least some of the data structure is generated in real time using information identifying one or more of the call stacks received while the process is running, and wherein the operations further including generating an alert that indicates that the blame frame meets the evaluation criteria; wherein the second stack frame is designated as the blame frame based on an indication that the second stack frame exhibits higher resource usage of the device resource than one or more other stack frames identified in the data structure.

A computer-implemented method for designating a stack frame as being responsible for device resource usage, the method including: evaluating, using an evaluation policy, a data structure that identifies stack frames of a process and indications of resource usage of a device resource over a period of time for respective stack frames; skipping, as part of said evaluating, a first stack frame of the data structure that is identified in the evaluation policy as a skip frame; designating a second stack frame of the data structure as a blame frame based on an indication of resource usage of the second frame meeting an evaluation criteria specified in the evaluation policy; and using one or more attributes of the blame frame to implement a remedial procedure to attempt to reduce resource usage of the process.

In addition to any of the above described methods, any one or combination of: wherein the data structure is based on snapshots of the process captured at discrete intervals over the period of time; further including, prior to said evaluating, generating the data structure in response to a data usage event triggered in response to usage of the device resource by the process; wherein the first stack frame is identified as a skip frame based on a resource usage statistic of the first stack frame known prior to said evaluating; wherein the evaluation criteria specifies that a stack frame that is not a skip frame and that exhibits a highest amount of resource usage of a set of stack frames is to be designated as the blame frame; wherein the remedial procedure includes one or more of: stopping execution of the process; debugging executable code of the process; or notifying an entity that owns the process that the process is exhibiting excess usage of the device resource.

A computer-implemented method for identifying a stack frame responsible for device resource usage, the method including: evaluating a data structure that identifies stack frames of a process and includes indications of resource usage of a device resource over a period of time for respective stack frames; ascertaining that a termination criterion specified in an evaluation policy for the data structure occurs at a particular stack frame, the termination criterion indicating a condition at which evaluation of the data structure is to terminate; and designating the particular stack frame of the data structure as a blame frame for usage of the device resource based on the occurrence of the termination criteria.

In addition to any of the above described methods, any one or combination of: wherein the data structure includes a tree that includes nodes that each represent different stack frames, each node includes a resource usage value for a respective stack frame, and the termination criterion specifies that when a resource usage contribution of each child node of the particular stack frame is less than a threshold percentage of the resource usage value of the particular stack frame, the particular stack frame is to be designated as the blame frame; wherein the data structure includes a tree that includes nodes that each represent different stack frames, and the termination criteria specifies a tree depth at which traversal of the tree is to terminate and the blame frame is to be designated; further including implementing a remedial procedure to attempt to reduce resource usage of the device resource by the process.

What is claimed is:

1. A system comprising:
    at least one processor; and
    one or more computer-readable storage media including instructions stored thereon that, responsive to execution by the at least one processor, cause the system perform operations including:
        evaluating, using an evaluation policy, a data structure that identifies stack frames from different call stacks of a process and indications of resource usage of a device resource over a period of time for respective stack frames;
        skipping a first stack frame of the data structure that is identified in the evaluation policy as a skip frame; and
        designating a second stack frame of the data structure as a blame frame for usage of the device resource based on an indication of resource usage of the second stack frame meeting an evaluation criteria specified in the evaluation policy.

2. A system as recited in claim 1, wherein the data structure is based on snapshots of the process captured at discrete intervals over the period of time.

3. A system as recited in claim 1, wherein the device resource comprises one or more of a processing unit, a data storage, or a memory device.

4. A system as recited in claim 1, wherein the resource usage of the second stack frame comprises one or more of:
    an amount of processing unit bandwidth utilized by the second stack frame;
    a period of time over which the second stack frame accessed the processing unit;
    a number of access operations by the second stack frame to a data storage; or
    an amount of memory utilized by the second stack frame.

5. A system as recited in claim 1, wherein the data structure is a tree, and the stack frames are represented by different nodes of the tree.

6. A system as recited in claim 1, wherein the data structure is a tree, and the first stack frame is closer to a root node of the tree than the second stack frame.

7. A system as recited in claim 1, wherein the first stack frame has a higher indication of resource usage of the device resource than the second stack frame.

8. A system as recited in claim 1, wherein at least some of the data structure is generated in real time using information identifying one or more of the call stacks received while the process is running.

9. A system as recited in claim 1, wherein at least some of the data structure is generated in real time using information identifying one or more of the call stacks received while the process is running, and wherein the operations further including generating an alert that indicates that the blame frame meets the evaluation criteria.

10. A system as recited in claim 1, wherein the second stack frame is designated as the blame frame based on an indication that the second stack frame exhibits higher resource usage of the device resource than one or more other stack frames identified in the data structure.

11. A computer-implemented method, comprising:
    evaluating, using an evaluation policy, a data structure that identifies stack frames of a process and indications of resource usage of a device resource over a period of time for respective stack frames;
    skipping, as part of said evaluating, a first stack frame of the data structure that is identified in the evaluation policy as a skip frame;
    designating a second stack frame of the data structure as a blame frame based on an indication of resource usage of the second frame meeting an evaluation criteria specified in the evaluation policy; and
    using one or more attributes of the blame frame to implement a remedial procedure to attempt to reduce resource usage of the process.

12. A method as described in claim 11, wherein the data structure is based on snapshots of the process captured at discrete intervals over the period of time.

13. A method as described in claim 11, further comprising, prior to said evaluating, generating the data structure in response to a data usage event triggered in response to usage of the device resource by the process.

14. A method as described in claim 11, wherein the first stack frame is identified as a skip frame based on a resource usage statistic of the first stack frame known prior to said evaluating.

15. A method as described in claim 11, wherein the evaluation criteria specifies that a stack frame that is not a skip frame and that exhibits a highest amount of resource usage of a set of stack frames is to be designated as the blame frame.

16. A method as described in claim 11, wherein the remedial procedure comprises one or more of:
stopping execution of the process;
debugging executable code of the process; or
notifying an entity that owns the process that the process is exhibiting excess usage of the device resource.

17. A computer-implemented method, comprising: evaluating, using an evaluation policy, a data structure that identifies stack frames of a process and indications of resource usage of a device resource over a period of time for respective stack frames in the data structure; skipping, as a part of the evaluating, a first stack frame of the data structure that is identified as a skip frame in the evaluation policy; and based on an indication of resource usage of a second stack frame meeting one or more evaluation criteria specified in the evaluation policy, reducing resource usage of the process using one or more attributes of the second stack frame to implement a remedial procedure.

18. A method as described in claim 17, wherein the first stack frame is identified as a skip frame based on a resource usage statistic of the first stack frame known prior to said evaluating.

19. A method as described in claim 17, wherein the one or more evaluation criteria specifies that a stack frame that is not a skip frame and that exhibits a highest amount of resource usage of a set of stack frames is to be used to implement the remedial procedure to reduce resource usage of the process.

20. A method as described in claim 17, wherein the remedial procedure comprises one or more of: stopping execution of the process; debugging executable code of the process; or notifying an entity that owns the process that the process is exhibiting excess usage of the device resource.

* * * * *